June 28, 1949.　　　　J. B. LOVICK　　　　2,474,482
TESTING INSTRUMENT FOR MACHINED PARTS
Filed March 28, 1944　　　　　　　　　　2 Sheets-Sheet 1

INVENTOR.
JOHN B. LOVICK.
BY James M. Abbett
ATTY.

June 28, 1949.  J. B. LOVICK  2,474,482
TESTING INSTRUMENT FOR MACHINED PARTS
Filed March 28, 1944  2 Sheets-Sheet 2

INVENTOR.
JOHN B. LOVICK.
BY James W. Abbott
ATTY.

Patented June 28, 1949

2,474,482

UNITED STATES PATENT OFFICE 2,474,482

TESTING INSTRUMENT FOR MACHINED PARTS

John B. Lovick, Glendale, Calif., assignor to Allied Appliance Co., Los Angeles, Calif., a copartnership comprising William P. Todd and Milton C. Miller, Jr.

Application March 28, 1944, Serial No. 528,457

3 Claims. (Cl. 177—311)

1

This invention relates to a testing device, and particularly pertains to a testing instrument for machined parts.

In machining duplicate and interchangeable parts for machines and various other pieces of equipment and apparatus, it is necessary to test the measurements of the parts to insure that certain critical dimensions are established within a relatively small degree of tolerance. In certain machine tool operations it is possible to establish accurate dimensions by the use of jigs and fixtures. However, in connection with the manufacture of certain parts this method is not infallible, particularly when parts are turned on a lathe or in an automatic screw machine. The present demand for high speed production of machinery and equipment incident to war work has made it necessary to provide some means of rapidly and accurately measuring machined parts with relation to certain critical dimensions. The usual method of accomplishing this is by micrometer measurements. An experienced and skilled inspector is required for this work, and furthermore, it often occurs that critical measurements must be made which cannot be made quickly and with precision by the use of a micrometer or calipers. The demand for inspectors capable of handling this type of testing is much greater than the supply, so that simple, accurate and infallible means are necessary in order to use previously untrained inspectors who are not highly skilled. The principal object of the present invention, therefore, is to provide a testing instrument in which machined parts may be placed quickly while being gripped at common points as the parts are successively placed in the instrument and removed, and after which the part may be tested for concentricity and for various lineal measurements within a predetermined set amount of tolerance, the instrument acting visually to indicate whether or not the machined part passes inspection or is rejected either as scrap or for re-machining operations.

The present invention contemplates the provision of a bed plate carrying a head and tail stock provided with interchangeable chucks to receive a piece of work, and by which the work piece may be rotated by a driving unit, the structure carrying gauge elements associated with visual indicators to apprise the operator as to whether or not critical dimensions of the work piece are within a predetermined limit of tolerance.

The invention is illustrated by way of example in the accompanying drawings in which:

2

Figure 1:
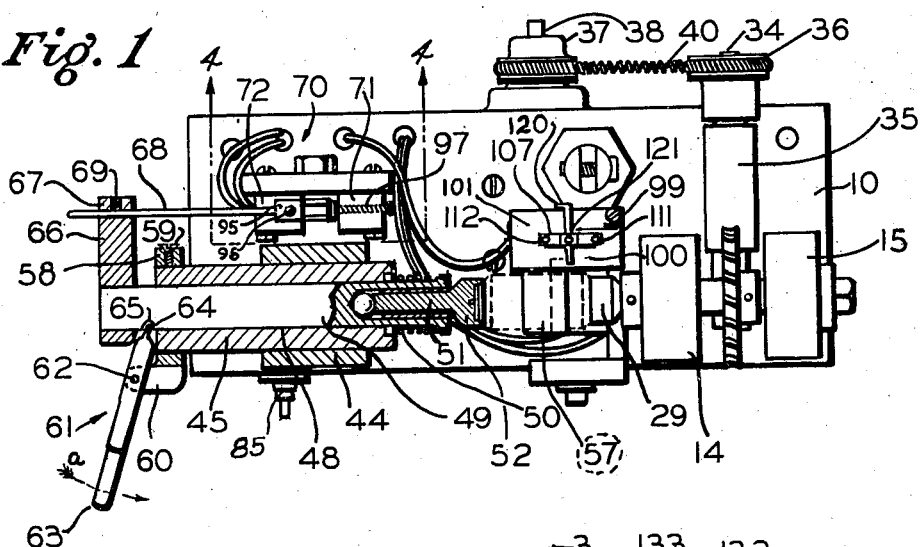
Figure 1 is a view in plan showing the testing device with parts of the tail stock being indicated in longitudinal section.
Figure 2:
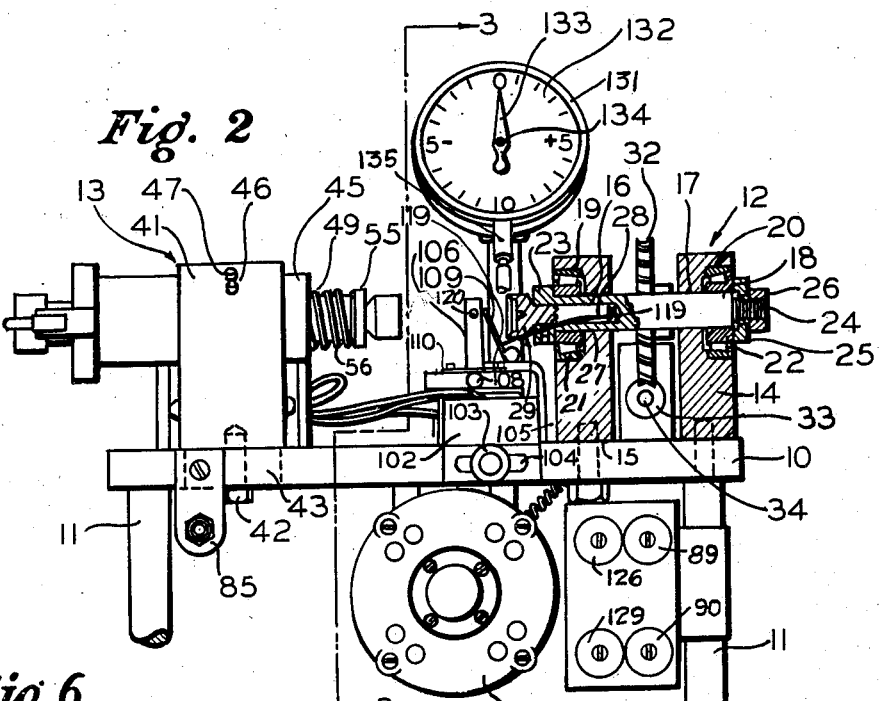
Fig. 2 is a view in front elevation showing the testing instrument with parts of the head stock indicated in vertical section.

Referring more particularly to the drawing, 10 indicates a bed plate of the testing instrument, which is here shown as mounted upon supporting legs 11 of suitable length. Mounted upon the bed plate is a fixed head stock 12 and a longitudinal adjustable tail stock 13. The head stock is formed by a pair of parallel uprights 14 and 15, which are disposed at one end of the bed plate 10 and are suitably secured in horizontally spaced relation to each other. Formed through the uprights 14 and 15 and in horizontal longitudinal alignment are bores 16 and 17. These receive a driving spindle 18 which passes through the two uprights and spans the intervening space. The opposite outer ends of the bores 16 and 17 are counterbored, as shown at 19 and 20, and receive anti-friction bearings 21 and 22, respectively. These bearings rotatably support the driving spindle 18. The inner end of the driving spindle is formed with an enlarged head portion 23 resting against the inner race of bearing 21, and the outer end of the spindle 18 is formed with a threaded portion 24 receiving a thrust collar 25 which bears against the inner race of the bearing 22 and is held in place by a nut 26. A central bore 27 is formed longitudinally in the end of the portion of the spindle 18 upon which the enlarged head 23 occurs. This bore receives a shank 28, upon the outer end of which a driving chuck 29 is mounted. By reference to Fig. 6 of the drawing it will be seen that the driving chuck 29 is formed with a shell-like outer wall 30, the marginal lip of which is formed with a bevel face 31 for a purpose to be hereinafter described.

Mounted upon the driving spindle 18 in the space between the uprights 14 and 15 is a worm gear 32. This gear is in mesh with a worm 33. The worm 33 is mounted upon a shaft 34 which extends horizontally beneath the gear 32 and with its axis at right angles to the axis of the spindle 18. Mounted upon the bed plate 10 in the rear of the uprights 14 and 15 is a bearing 35 through which the shaft 34 extends. The rear end of the shaft 34 carries a pulley 36 which is in alignment with a pulley 37 carried upon armature shaft 38 of a driving motor 39. The driving motor 39 is supported upon and beneath the bed plate 10. A driving belt 40 is led around the pulleys 36 and 37 to impart motion from the motor shaft 38 to the worm shaft 34. In order to drive the shaft 38 with some degree of flexibility it is desirable to use a helical spring belt.

Mounted upon the opposite end of the bed plate 10 from that occupied by the head stock 12 is the tail stock 13. This includes a standard 41 which is slidable upon the upper face of the bed plate 10 and may be set in position by a cap screw 42 which extends upwardly through a slot 43 in the bed plate. The slot 43 extends longitudinally of the bed plate so that the tail stock 13 may be disposed in a desired spaced relation to the head stock 12. The standard 41 is formed with a central horizontal bore 44 through which a cylindrical sleeve 45 may extend. The sleeve may slide longitudinally through the bore 44 and may be locked by a set screw 46 which passes through a threaded opening 47 in the upright 41. The sleeve 45 has a central cylindrical bore 48 extending longitudinally through it to receive a tail stock spindle 49. This spindle extends outwardly from opposite ends of the sleeve. The end which projects toward the head stock 12 is formed with a central bore 50 to receive the shank 51 of a movable chuck 52. This chuck is complementary to the chuck 29 and is formed with a cylindrical wall section 53, the outer marginal edge of which has a tapered face 54. The end of the spindle 49 which receives the shank 51 of the chuck 52 is formed with an enlarged shoulder 55. Disposed between the shoulder 55 and the end face of the sleeve 45 is a spring 56 which urges the spindle forwardly, and thus yieldably holds a piece of work, indicated by dotted lines in Fig. 1 at 57, between the chucks 29 and 52.

The outer end of the sleeve 45 is provided with a collar 58 secured in position by a set screw 59. The collar 58 is formed with an arm 60 upon which a shifting lever 61 is mounted by a pivot pin 62. This lever swings horizontally and projects forwardly from the bed plate 10, as particularly shown in Fig. 1. A handle 63 is formed on the outer end of the lever 61 and a finger 64 is formed on the inner end of the lever. The finger 64 extends into a groove 65 formed in the side of the spindle 49. The shape of the end of the finger 64 and the groove 65 are such as to insure that as the lever 61 is swung on its pivot the spindle 49 will be reciprocated longitudinally within the bore 48 of the sleeve. Secured upon the outer end of the spindle is a switch arm 66 which is formed with a transverse bore 67 at its free end. Extending into this bore is a switch rod 68 which is secured adjustably by a set screw 69. The rod 68 extends horizontally and parallel to the longitudinal axis of the spindle 49 and passes above and across a gauge switch unit 70.

Figure 5:
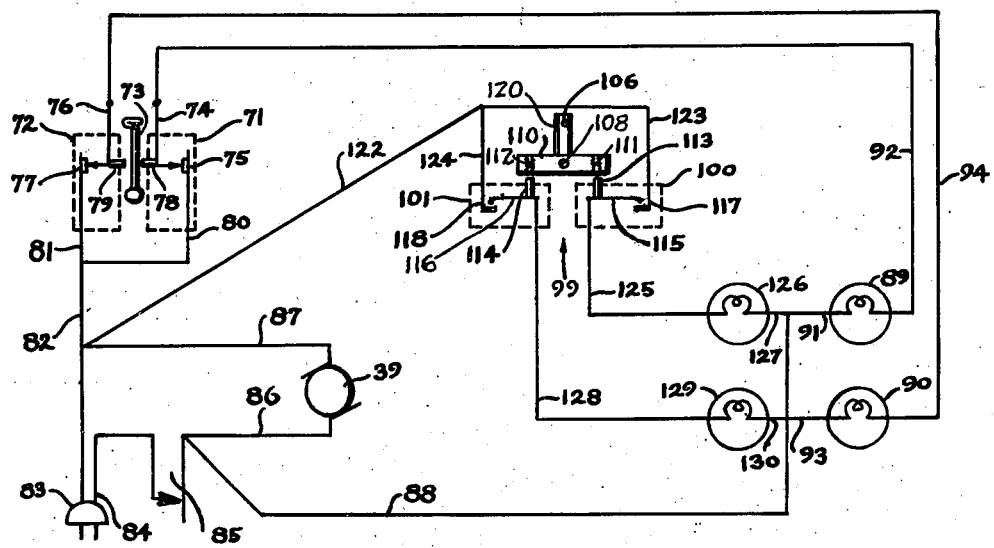
Fig. 5 is a view in diagram showing the indicating lamps and the wiring arrangement of the switch gauges.

The gauge switch unit 70 includes a pair of switch blocks 71 and 72 between which a switch lever 73 is mounted to oscillate. As shown diagrammatically in Fig. 5 of the drawing, the block 71 carries a movable contact element 74, which engages a fixed contact 75. The block 72 carries a movable contact element 76, which engages a fixed contact 77. The movable contact element 74 carries a pin 78. The movable contact element 76 carries a pin 79. These pins are disposed upon opposite sides of the switch lever 73 and may be engaged by the lever alternately to close and open electric circuits through switch blocks 71 and 72. The fixed contacts 75 and 77 are provided with conductors 80 and 81, respectively. These are secured to a lead wire 82 leading to one side of an input power plug 83. The opposite side of the power plug 83 is provided with a conductor 84 leading to one pole of a make and break switch 85, which is secured upon the bed plate 10. The opposite pole of the switch 85 is provided with a conductor 86 leading to one side of the driving motor 39. The opposite side of the motor 39 is provided with a conductor 87 which connects to the power lead line 82. A conductor 88 leads from one side of the switch 85 and provides a common feed wire for signal lights 89 and 90 controlled by the switch blocks 71 and 72 of the switch unit 70. A conductor 91 is connected to one side of the signal light 89, and a conductor 92 is connected to the opposite side of the signal light 89. The conductor 92 is electrically connected with the movable contact member 74 of the switch block 71. A conductor 93 connects to one side of the signal light 90 while the opposite side of the light is provided with a conductor 94 leading to the movable switch element 76 of switch block 72. Thus, when the switch in block 71 is closed the signal light 89 will be illuminated, and when the switch in block 72 is closed the signal light 90 will be illuminated. The closing of the circuits through switch blocks 71 and 72 is effected by movement of the intermediate switch lever 73, as previously described. This lever has a fork extending transversely through its free end. Within the crotch of this fork the switch rod 68 lies. Mounted upon the rod 68 at one side of the lever 73 is an adjustable collar 95 which is held in set position by a set screw 96. This collar bears against the vertical face of the switch lever 73 adjacent to the switch block 72. Upon the opposite face of the switch lever 73 a compression spring 97 is provided. This is mounted upon the switch rod 68 and is interposed between the face of the switch lever 73 and an enlarged shoulder 98 formed at the end of the switch rod 68.

The switch unit 70 and the signal lights 89 and 90 are here shown as provided for making linear measurements. It is preferable that the two lights shall be of different color, as for example, the light 89 may be red and the light 90 may be yellow. The switch and its operating means are so designed as to cause the yellow light 90 to be illuminated when the piece of work 57 is too long and its measurement exceeds a plus tolerance limit of a given dimension. The red light 89 is intended to be illuminated when the piece of work 57 is too short, and the measurement is less than a minus tolerance limit of a given dimension. It will be recognized that when the measurement does not exceed the plus or minus tolerance limit neither of the lights 89 or 90 will be illuminated.

Inspection may be necessary for other linear dimensions, as for example, from the point of contact of the piece of work 57 with the face 31 of the driving chuck 29 to a shoulder on the piece of work. For this purpose a switch unit 99 is provided. This unit comprises switch blocks 100 and 101. These blocks are mounted on a cross carriage 102 which rests upon the bed plate 10 and is secured adjustably in position by a set screw 103 passing through a slotted opening 104 in the carriage and permitting the carriage to be moved longitudinally of the bed plate and between the head stock 12 and the tail stock 13. Mounted upon the cross carriage 102 is a horizontal bracket 105. This bracket provides a pivotal mounting for a vertical oscillating post 106. The post is mounted within a slot 107 formed through the bracket 105 and is carried on a pivot pin 108. The post has a T-shaped foot providing arms 109 and 110 which extend oppositely from the pivot within the slot. These arms are fitted with adjusting screws 111 and 112 which rest upon contact points 113 and 114 of movable switch elements 115 and 116, respectively. The switch element 115 is part of the switch block 100. The switch element 116 is part of the switch block 101. Complementary to the switch element 115 is a contact 117. Complementary to the switch element 116 is a contact 118. A tension spring 119 is mounted by one end upon the bracket 105 and by its other end to the post 106. This spring is intended to urge the post toward a work shoulder, and when no work is in the chuck will close switch block 101, it being understood that when oscillated around its pivot 108 the screws 111 or 112 will contact the pins 113 and 114 of the switch blocks and close one or the other of the switches 100 or 101. Carried upon the post 106 and extending horizontally and parallel to the axis 108 is a caliper finger 120. This finger passes through an opening in the post 106 and is held in an adjusted position by a set screw 121. The side of the caliper finger 120 is intended to bear against a work face, as will be hereinafter described. The switch blocks 100 and 101 are connected to the feed wire 82 by a conductor 122, which in turn is provided with conductors 123 and 124 connecting to the contact elements 117 and 118, respectively. The switch element 115 is connected by a conductor 125 to one side of a signal light 126. The opposite side of the signal light 126 is connected to a conductor 127. The switch element 116 is connected to a conductor 128 which leads to one side of a signal light 129. The opposite side of the signal light 129 is provided with a conductor 130. It will be seen in Fig. 5 that lamp conductors 91, 93, 127 and 130 are connected to the common feed wire 88.

In inspection tests it is desirable to test the parts for concentricity coincident with the test of linear dimensions. In order to do that a precision gauge 131 is provided and preferably has a dial 132 graduated in thousandths and over which an indicating hand 133 may swing. This hand is actuated by mechanism within the case of the gauge and connected with the center pin 134. Interposed between the gauge mechanism and the work is a spindle 135 which rests against the work to be measured. The back of the case of the precision gauge 131 is fitted with a lug 136 pivoted by a pin 137 to a supporting post 138. The lower end of the supporting post is fitted with a ball 139 mounted within a socket structure 140. The socket 140 is secured to the bed plate 10 and makes it possible for the precision gauge to be properly adjusted with relation to the work to be inspected.

Figure 6:
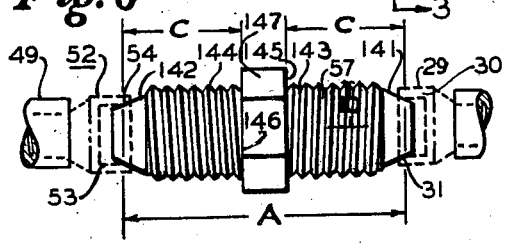
Fig. 6 is an enlarged view in diagram indicating the critical dimensions of the work part and showing the manner in which the driving and driven chucks engage the work.
Figure 3:
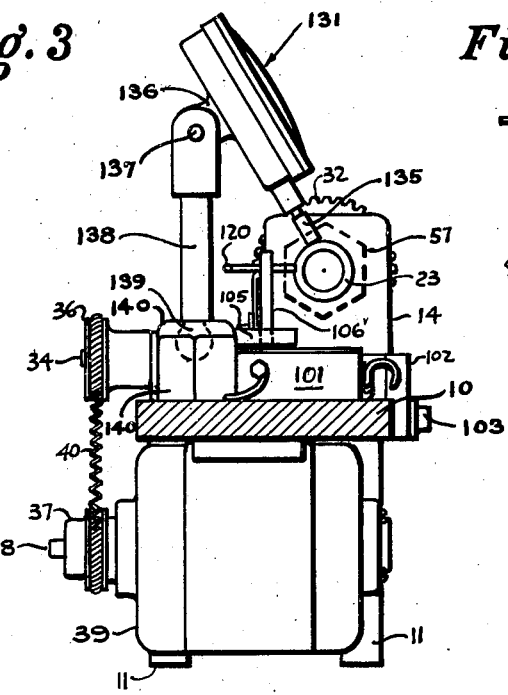
Fig. 3 is a view in vertical section through the testing instrument, as seen on the line 3—3 of Fig. 2, and shows the relative position of the driving motor to the bed plate, as well as the micrometer for testing concentricity and a gauge finger for testing linear dimensions.
Figure 4:
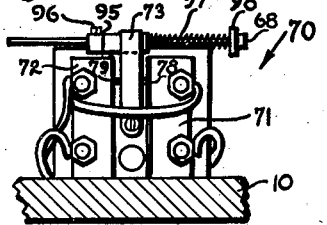
Fig. 4 is an enlarged fragmentary view in vertical section as seen on the line 4—4 of Fig. 1, and shows the electric switch gauge associated with the tail stock.

In describing the operation of the present invention it is to be understood that Fig. 6 of the drawing merely shows one piece of work which may be inspected in a testing device of the present type, and it will be recognized that variations in adjustment may be made to receive and inspect work pieces of different sizes and shapes and having different critical dimensions. It is also to be understood that if required the chucks 29 and 52 may be interchanged with other types of holding means or centers in order to accommodate different pieces of work. The work piece 57, which is here shown in explaining the invention, has been selected since the critical dimensions use a tapered face as a bench mark. This particular work piece is provided as a coupling between the ends of tubular metal conduits and into which ends the tapered portions 141 and 142 of the work piece 57 extend. The portions 141 and 142 each represent the frustum of a cone of the same dimensions. It is necessary that these conical portions shall be absolutely concentric with threaded extensions 143 and 144 of the coupling 57 so that nuts passing over the threaded portion and carrying tapered members bearing against the outer face of the conduit to be coupled will bear uniformly along a plane normal to the axis of the coupling, and will produce continuous line contact between the outwardly flaring end of the conduit and the frustoconical end of the coupling. Thus, two critical dimensions are an overall dimension from the plane of line contact of the faces 31 and 54 of the chucks 29 and 52, and dimensions representing the concentricity of the threaded portions 143 and 144 with relation to the portion of the conical ends 141 and 142. The first of these critical dimensions is indicated as A in Fig. 6 of the drawing, and the second of these dimensions is indicated as B. Another critical dimension on the coupling 57 is the distance from the plane of contact of the chucks with the cones 141 and 142 to shoulders 145 and 146 of a hexagonal portion 147 at the center of the coupling. These dimensions are indicated as C in Fig. 6. It will be assumed that a certain amount of tolerance is permissible. Thus, the critical dimensions are A plus or minus .002, B plus or minus .005, and C plus or minus .002. The instrument is then prepared for use by selecting and installing the proper chucks 29 and 52, or other centering means, after which the tail stock 13 is adjusted longitudinally to bed plate 10 to accommodate the work piece 57. The tail stock is then clamped in position by the set screw 42. The sleeve 45 within the tail stock may be adjusted also by untightening screw 46. This will permit the sleeve 45 and the spindle 49 to move as a unit, and will retain uniform tension upon the spring 56. After this adjustment has been made the screw 46 may be tightened. The switch unit 70 is then adjusted for dimension A and by loosening the set screw 69 to move the switch rod 68 appropriately, and then loosening the set screw 96 to move the adjusting sleeve 95, the amount of tolerance in dimension A may be determined accurately. After these adjustments have been made the set screws 69 and 96 may be tightened on the switch rod 68. The carriage 102 may then be adjusted on the bed plate 10 by releasing the set screw 103 and sliding the carriage along until the side face of the caliper finger 120 assumes a desired position with relation to the plane of contact of the faces 31 of the chuck 29. When the side face of the caliper finger 120 is in a properly set position the post 106, which carries it, will be standing substantially vertically, and the set screws 111 and 112 will be adjusted to have an equal space between them and the pins 113 and 114 of the switch blocks 100 and 101. The set screws 111 and 112 will also be adjusted so that the normal space between them and the pins will represent the amount of tolerance in the dimension C. The precision gauge 131 is then adjusted so that when the end of its spindle rests against the circumference of the work, such for example as the circumference of the threaded ends 143 and 144 the index hand 133 will stand at zero on the dial 132. This will represent the precise diameter of the work piece being inspected, and as the diameter varies in concentricity the indicating hand will swing toward plus or minus graduations. The machine thus adjusted is ready for use in inspecting parts, it being understood that the plug 83 has been connected with a suitable source of electric supply to provide energy for the motor 39 as well as current for the gauge lights 89, 90, 126 and 129. The work may then be placed in the device, as indicated in Figs. 1 and 6. Here it will be seen that the chuck faces 31 and 54 will contact the faces of the frustoconical members 141 and 142 at a point midway the length of these members. The work is placed between the chucks 29 and 52 by swinging the lever 61 in the direction of the arrow *a* in Fig. 1. This retracts the spindle 49 against the action of the spring 56. As this movement takes place the spring 67 on the switch rod 68 will also be compressed. When the lever 61 is released the parts will be restored to their original positions and the machined part 57 will be clamped between the chucks 29 and 52. The switch 85 may then be closed to deliver a supply of current to the wiring system. This will cause the motor to be energized so that the driving spindle 18 will be rotated through the driving belt 40, the worm 33, and the worm gear 32. When the work is thus placed the side face of the caliper finger 120 will bear against the face 145 of the work piece 57, and the precision gauge 131 may be swung over the work until the end of its spindle 135 contacts the circumferential face of the threaded portion 143. When the lever 61 is released the movable switch element 73 of the switch unit 70 will be disposed in a relation to the contact pins 78 and 79 of the switch blocks 71 and 72 as determined by the dimension A on the work piece. In the event that the distance A, as represented by the transverse planes contacted by the chuck faces 31 and 54, is greater than the absolute dimension the switch lever 73 will be drawn toward the block 72, and if the variation is sufficiently great to establish an electric circuit through the switch block 72 to the gauge light 90, this will then be illuminated, and will indicate that the dimension A exceeds the limited amount of tolerance. The work piece 57 may then be immediately removed from the instrument and returned for reworking. If, however, the distance A is less than the minus amount of tolerance the switch lever 73 will swing toward the switch block 71 and establish an electric circuit through the gauge light 89. This will indicate that the dimension A is too short and will necessitate in placing this particular part into scrap. A test is concurrently made for the dimension C on the threaded end 143 of the work piece. If the distance from the plane of contact of the face 31 of the chuck to the shoulder 145 on the work piece is greater than desired the post 106 will swing to establish an electric contact through the switch block 101, which will energize the gauge light 129 and indicate that this distance is too long. If the distance C is too short the circuit in the switch block 101 will be closed, thus completing the circuit through the gauge light 126. During this time the indicating hand on the precision gauge 131 may fluctuate at opposite sides of the zero graduation, and if this fluctuates more than the required plus or minus tolerance the inspection report will indicate that there is an undesired amount of eccentricity of the threaded portions with relation to the axis of the work piece. It will of course be recognized that in the event none of the gauge lights are illuminated the critical dimensions A and C of the work piece are within the plus or minus tolerance limits. It also should be pointed out that after the dimension C of the portion 143 of the work piece has been measured it is necessary to remove the work piece from between the chucks and reverse it so that the length of the portion 144 may be measured.

It will thus be seen that by the use of the testing instrument here described it is possible to measure linear overall lengths and intermediate overall lengths of parts quickly and with micrometer precision even though the parts are difficult to measure by ordinary methods, and furthermore, that it is possible to inspect a part for variation in concentricity with great accuracy, the instrument being simple in construction, not liable to get out of order, and being so designed as to make it possible for relatively unskilled workmen to operate it satisfactorily.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A testing device to receive a work piece to be inspected and upon which linear dimensions are to be measured, which comprises a base structure, a fixed bearing standard carried thereby, a movable bearing standard carried thereby, means whereby the movable standard may be set adjustably with relation to the fixed standard, a spindle mounted upon the fixed standard and held against longitudinal movement, a spindle mounted upon the movable standard and adapted to be longitudinally movable, a pair of chucks, one carried by the fixed spindle and one carried by the movable spindle and between which the article to be tested is held, switch actuating means associated with the movable spindle, a two-way switch operated by said switch actuating means, one of said switch elements being closed in the event the length of the portion of the article to be tested and occurring between the chucks is greater than a predetermined distance and the other acting when the article to be tested is less than a predetermined distance, and means associated separately with said switches to indicate the operation of the same.

2. The structure of claim 1 including adjusting means interposed between said switch actuating means and the two-way switch whereby the degree of tolerance may be established.

3. A testing device to receive a work piece to be inspected and upon which linear dimensions are to be measured, which comprises a base structure, a fixed bearing standard carried thereby, a movable bearing standard carried thereby, means whereby the movable standard may be set adjustably with relation to the fixed standard, a spindle mounted upon the fixed standard and held against longitudinal movement, a spindle mounted upon the movable standard and adapted to be longitudinally movable, a pair of chucks, one carried by the fixed spindle and one carried by the movable spindle and between which the article to be tested is held, said chucks being designed to establish line contact with the article being tested and between which lines of contact a measurement is taken, switch actuating means associated with the movable spindle, a two-way switch operated by said switch actuating means, one of said switch elements being closed in the event the length of the portion of the article to be tested and occurring between the chucks is greater than a predetermined distance and the other acting when the article to be tested is less than a predetermined distance, and means associated separately with said switches to indicate the operation of the same.

JOHN B. LOVICK.

REFERENCES CITED

The following references are of record in the file of this patent:

UNITED STATES PATENTS

| Number | Name | Date |
|---|---|---|
| 454,516 | Brown | June 23, 1891 |
| 652,622 | Marshall | June 26, 1900 |
| 952,588 | Stevens | Mar. 22, 1910 |
| 1,317,459 | Rouanet | Sept. 30, 1919 |
| 1,319,361 | Rouanet | Oct. 21, 1919 |
| 1,389,341 | Blood | Aug. 30, 1921 |
| 1,667,109 | Garlent | Apr. 24, 1928 |
| 1,832,511 | Settem | Nov. 17, 1931 |
| 1,900,231 | Ede | Mar. 7, 1933 |
| 2,030,237 | Brittain | Feb. 11, 1936 |
| 2,047,408 | Emery et al. | July 14, 1936 |

FOREIGN PATENTS

| Number | Country | Date |
|---|---|---|
| 325,063 | Germany | Sept. 8, 1920 |